(12) United States Patent
Hoglund

(10) Patent No.: US 6,721,826 B2
(45) Date of Patent: Apr. 13, 2004

(54) BUFFER PARTITIONING FOR MANAGING MULTIPLE DATA STREAMS

(75) Inventor: Timothy E. Hoglund, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 222 days.

(21) Appl. No.: 09/962,645

(22) Filed: Sep. 25, 2001

(65) Prior Publication Data

US 2003/0061413 A1 Mar. 27, 2003

(51) Int. Cl.[7] .......................... G06F 13/14; G06F 13/28

(52) U.S. Cl. .......................... 710/52; 710/22; 710/34; 710/35; 710/56; 711/173

(58) Field of Search .............................. 710/22, 34, 35, 710/52, 56; 711/173

(56) References Cited

U.S. PATENT DOCUMENTS

| | | | | |
|---|---|---|---|---|
| 5,404,522 A | * | 4/1995 | Carmon et al. | 709/107 |
| 5,881,316 A | * | 3/1999 | Chaney et al. | 710/56 |
| 5,956,340 A | * | 9/1999 | Afek et al. | 370/412 |
| 5,958,017 A | * | 9/1999 | Scott et al. | 709/235 |
| 6,006,286 A | * | 12/1999 | Baker et al. | 710/22 |
| 6,449,666 B2 | * | 9/2002 | Noeldner et al. | 710/23 |
| 6,470,409 B1 | * | 10/2002 | Ridgeway | 710/305 |
| 6,539,024 B1 | * | 3/2003 | Janoska et al. | 370/412 |

* cited by examiner

*Primary Examiner*—Rehana Perveen
(74) *Attorney, Agent, or Firm*—Suiter·West PC LLO

(57) ABSTRACT

The present invention is directed to a buffer partitioning system and a method employing the system to dynamically partition buffer resources among multiple data streams. The buffer partitioning system utilizes context information relating to the streaming data to control the flow of data through the buffer resource. By including a buffer partitioning system, multiple data streams may be more efficiently transferred through buffer resources thus resulting in faster data transfers.

26 Claims, 5 Drawing Sheets

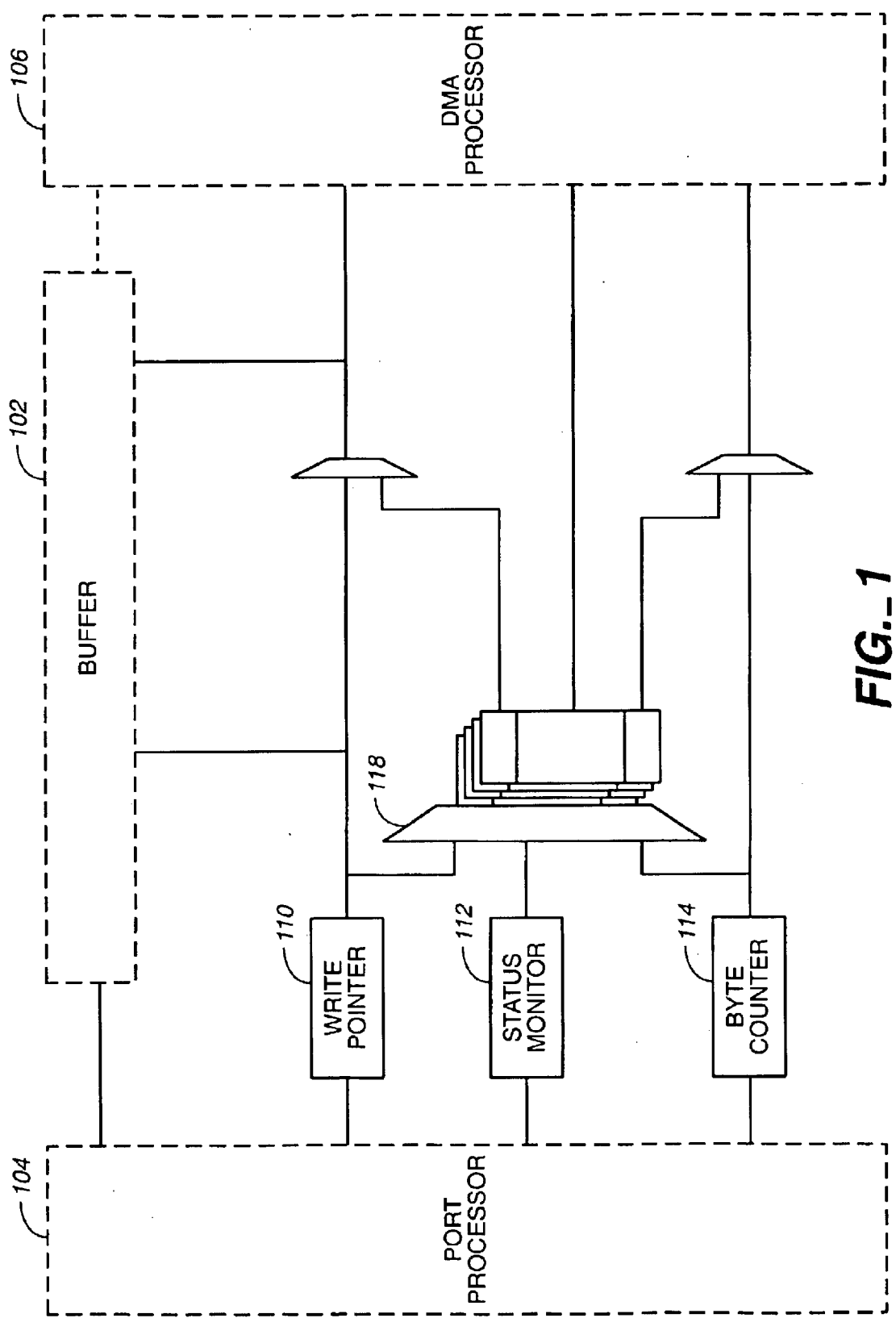
FIG._1

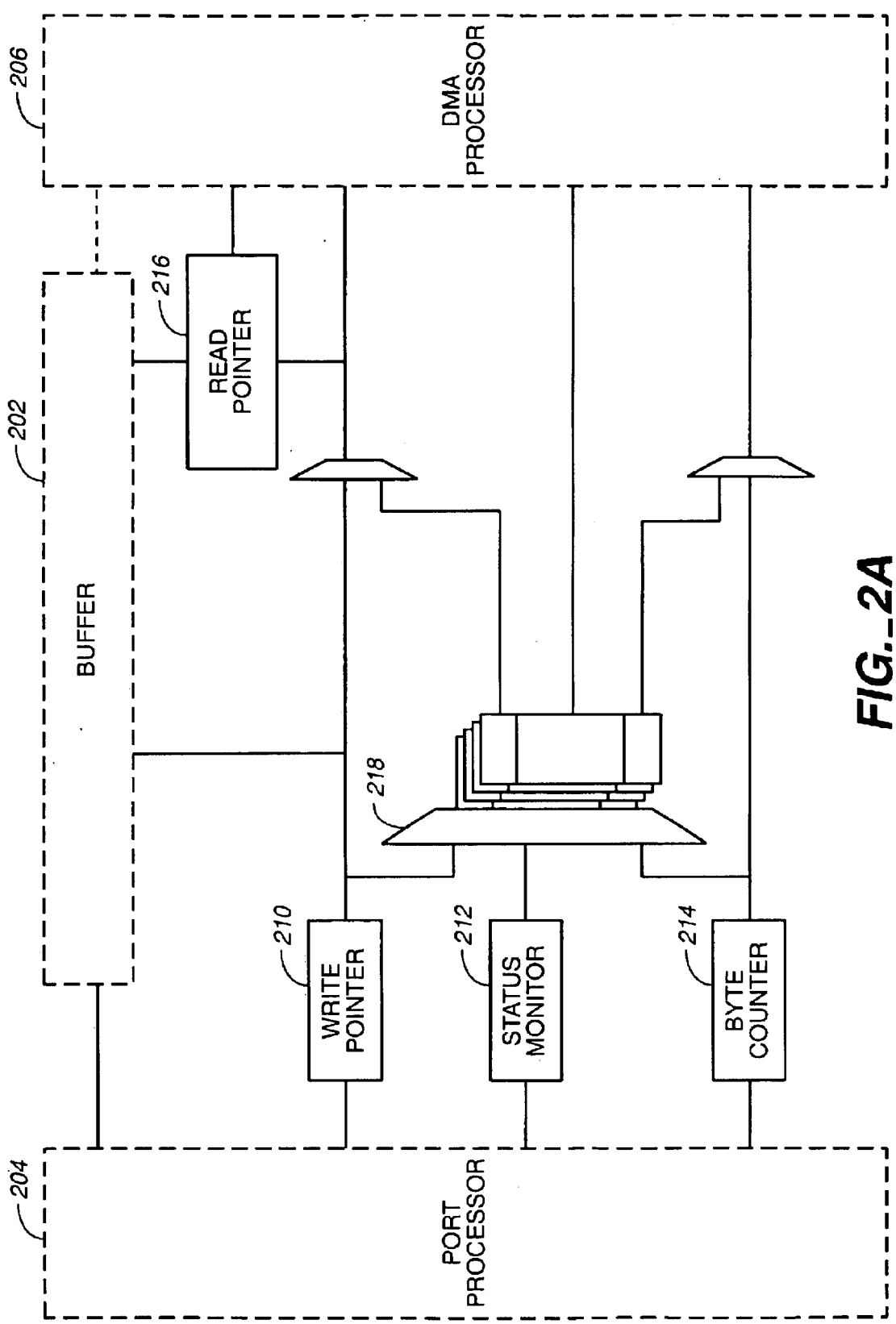
FIG._2A

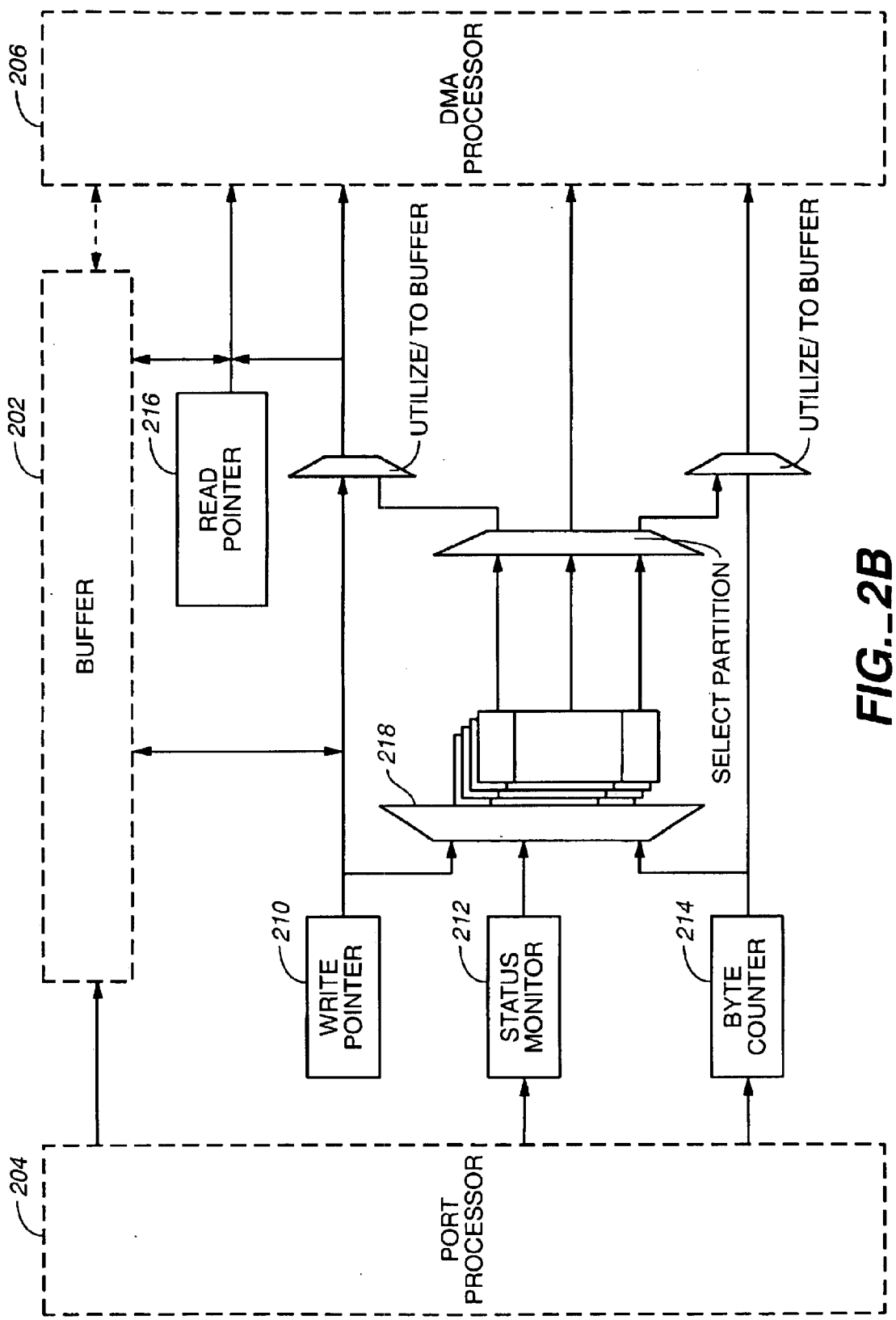
FIG._2B

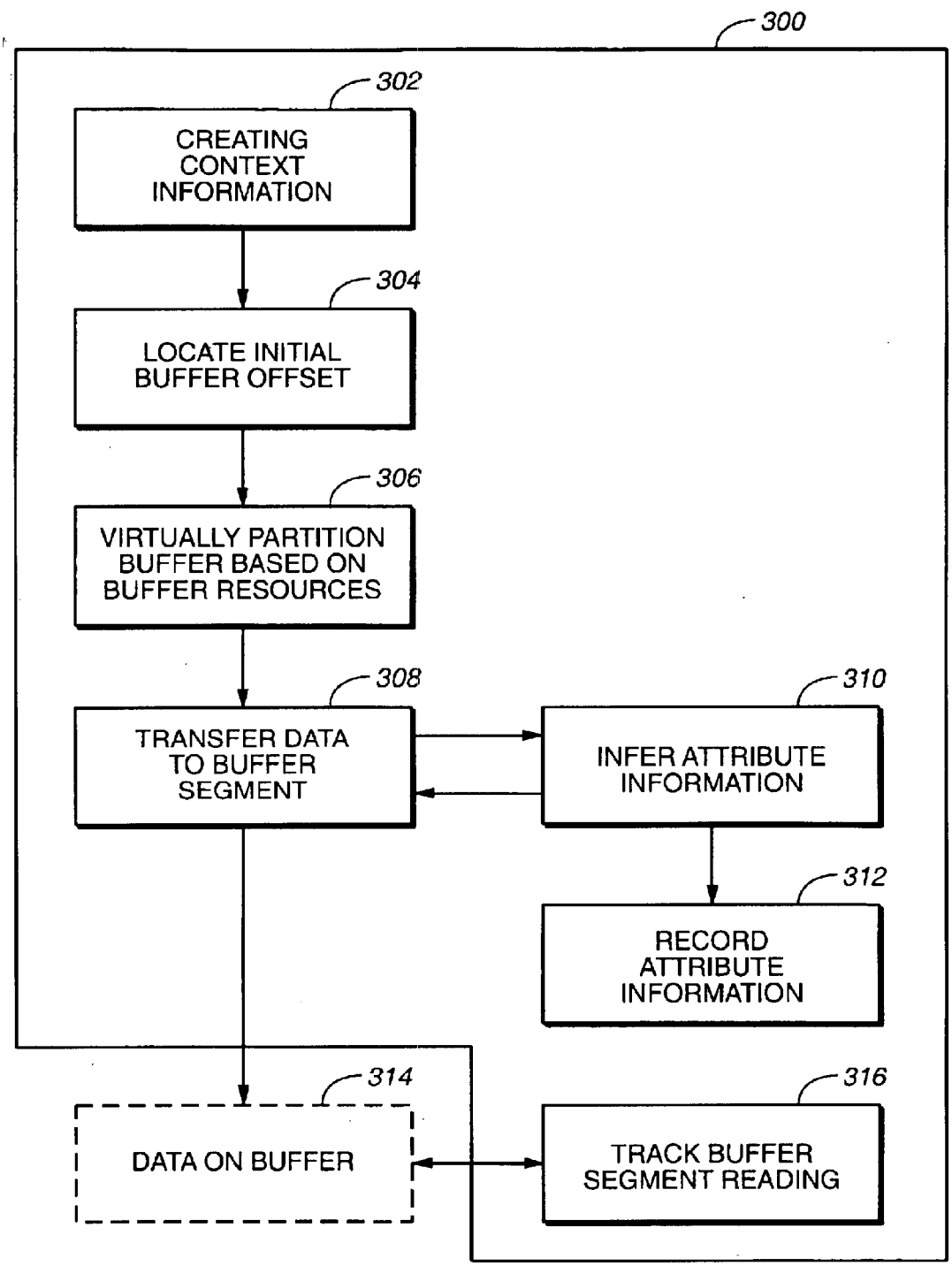
FIG._3

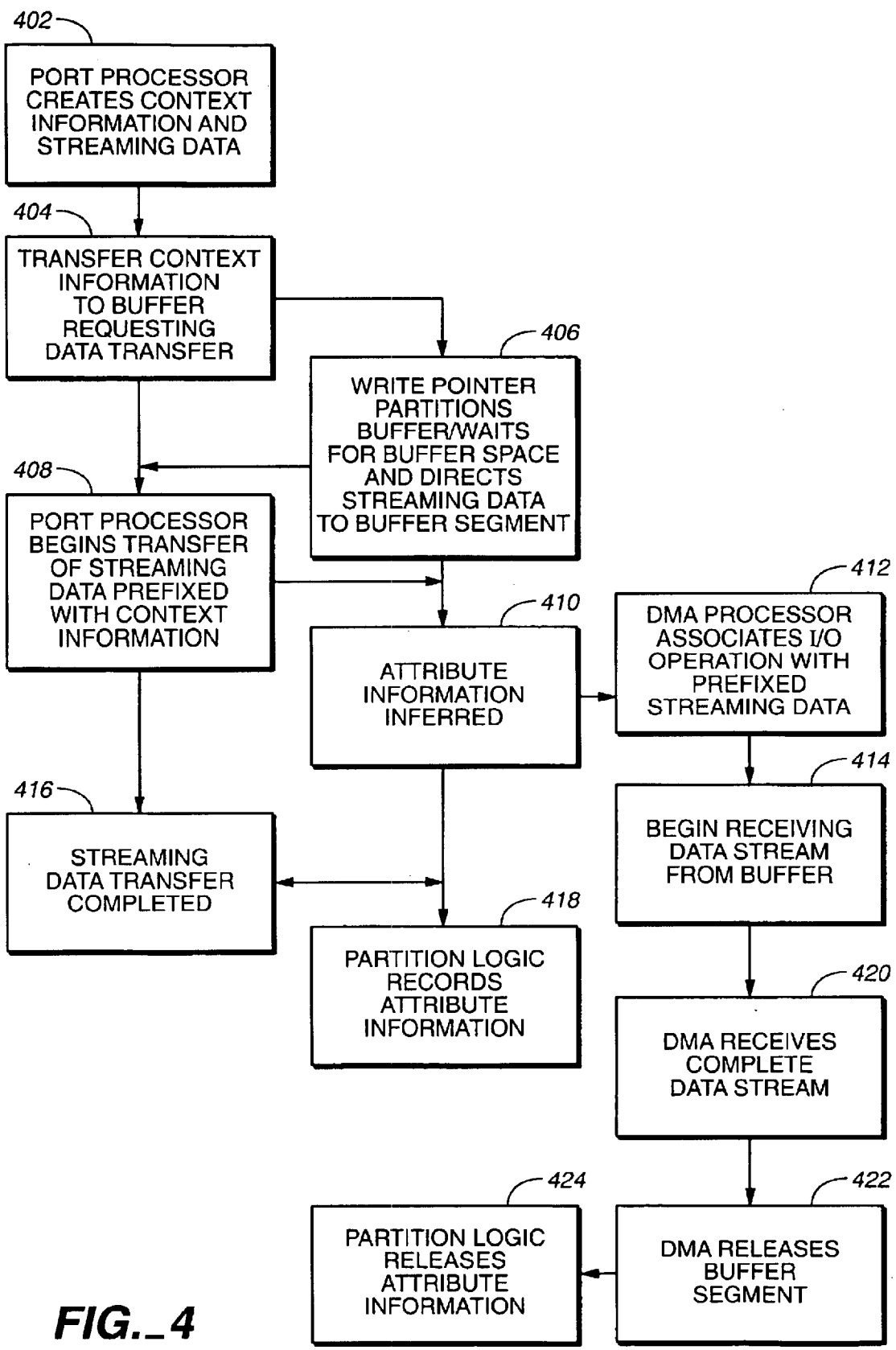
FIG._4

BUFFER PARTITIONING FOR MANAGING MULTIPLE DATA STREAMS

FIELD OF THE INVENTION

The present invention generally relates to the field of computer data transfers and particularly to a protocol and controller suitable for managing multiple data transfer streams in a buffer for use in direct memory access (DMA).

BACKGROUND OF THE INVENTION

Developments in computer technology have led to faster information handling systems capable of handling more data. Recent technological development have focused on the creation of hardware capable of handling more data in an increasingly efficient manner and on the creation of hardware protocols to increase the efficiency of the information handling system resources. Developments making more efficient use of the information handling system resources yield tremendous advantages over competing systems and result in superior information handling systems and increased cost savings.

Presently, when certain computing processes are carried out bottlenecks occur due to inefficient use of a particular resource. As a result, the inefficiently used resource becomes a limiting factor and the rate of the desired processes is then limited by the resource's capability.

One such bottleneck occurs when data is streamed through a buffer for use in direct memory access (DMA) and media applications. Currently, data streams are typically transferred in tightly coupled flows through a buffer which are limited to the transfer of a single data stream. The effect of this type of operation is that buffer resources are then unable to be utilized for other streams of data. Thus, the transfer of data through the buffer limits the total amount of data transferred in DMA applications.

Therefore, it would be desirable to provide a protocol and hardware suitable for decoupling media and DMA transfers through a buffer resource for more efficient buffer resource utilization.

SUMMARY OF THE INVENTION

Accordingly, the present invention is directed to a buffer partitioning system and a method employing the system to dynamically partition buffer resources among multiple data streams. By including a buffer partitioning system, multiple data streams may be more efficiently transferred through buffer resources resulting in information handling systems with increased capabilities and cost savings. In a first aspect of the present invention, a buffer partitioning system includes a write pointer capable of virtually partitioning a buffer and directing streaming data to a segment of the buffer formed by the virtual partition, a status monitor suitable for reporting transfer status information, a byte counter suitable for determining the a total number of bytes in the data stream and a partitioning logic suitable for managing steaming data transfers through the buffer thus providing a dynamic partitioning buffer resources.

In a further embodiment of the present invention a buffer partitioning system may contain a read pointer communicatively linked to the write pointer. The read pointer may be capable of determining the segment of the buffer streaming data will be read. In addition, by linking the write pointer to the read pointer, the buffer partitioning system may derive additional information such as the number of bytes remaining to be read in the segment and the like.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an overview illustration of an exemplary embodiment wherein a buffer partitioning system is shown;

FIG. 2A is an overview illustration of an exemplary embodiment wherein a buffer partitioning system including a read pointer is shown;

FIG. 2B is a overview illustration of exemplary data transfers and utilization shown for the buffer partitioning system of FIG. 2A;

FIG. 3 is a flow diagram illustrating an exemplary method of monitoring transfers of streaming data to more efficiently utilize buffer resources; and FIG. 4 is a flow diagram depicting the transfer of a single data stream through a buffer employing the buffering partitioning logic of an exemplary embodiment, for decoupling data transfers.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown wherein streaming data is decoupled to more efficiently utilize buffer resources for the transfer of multiple data streams. Decoupling data generally may refer to the process of allowing the data stream transferred into the buffer to be independent of the data being read or removed from the buffer.

Referring now to FIG. 1, a buffer partitioning system may be capable of dynamically partitioning a buffer 102. For example, a buffer partitioning system for decoupling streaming data may be disposed such that streaming data between a port processor 104 and direct memory access (DMA) processor 106 may be decoupled to utilize a dynamic partitioning of the buffer 102. In one example, streaming data includes input/output (I/O) operations to be performed by DMA processor 106. In advance of the actual transfer of streaming data to the buffer 102, port processor 104 creates context information suitable for representing streaming data. Context information may include data suitable for reconstructing streaming data upon reception by DMA processor 106 Context information may include data identification, numbering sequence, and data type. Data types include solicited data, unsolicited data. Context information may be similarly utilized like a frame header in fiber channel or a LQ nexus in a parallel small computer system interface (SCSI). In a first example, the context information is independently transferred from the streaming data for presentation to the DMA processor. In a second example, context information may be a prefix to the transferred streaming data.

The buffer partitioning system may be utilized to allocate buffer resources among various data streams. For example, a write pointer 110 communicatively coupled to the buffer may direct the positioning of data from the port processor 104 on to the buffer 102 based on available buffer resources. For instance, the streaming data may contain a certain number of byte of information thus the write pointer 110 may direct the transfer of streaming data to a location on the buffer 102 based on available space on the buffer 102. In the present case, the write pointer may direct streaming data to the next available space on the buffer. In this example, the write pointer may direct streaming data to various locations on the buffer until the buffer 102 is at full capacity at which time the write pointer may halt the transfer of stream data on to the buffer 102 until space becomes available. Thus the buffer may receive multiple streams of data to make more efficient use of available buffer resources. Furthermore, the write pointer 110 may direct data streams so as to virtually partition different streams of data into segments on the buffer 102. Virtual partitioning may be achieved through the placement of various streams of data on different locations on the buffer. For example a first data stream may be transferred to the buffer and then a second data stream may be transferred so that the beginning of the second stream of data is located after the end of the first data stream. In a further example streaming data may be transferred in a method similar to a traditional speed matching first in first out process through the buffer to a DMA processor 106 if the streaming data is sufficiently large or the streaming data is being requested by the DMA processor 106.

Furthermore, because write pointer 110 directs the transfer of streaming data the data may be independently transferred based on functional requirements, such as available space on the buffer. For example, the write pointer 110 may direct streaming data to a particular location on the buffer, such as the next available space on the buffer 102 based on the total bytes available on the buffer, resulting in streaming data being decoupled from previous data transfers.

Communicatively coupled to the port processor 104 is a status monitor 112 capable of generating messages related to the transfer of streaming data. For example, during a transfer of data streaming data may be accidentally cut-off due to a power surge or the like, and thus data may not be transferred to the buffer 102. Upon the occurrence of such events, status monitor 112 may generate transfer status messages to alert other resources in the buffer partitioning system 108 of the event. As a result, the buffer partitioning system 108 may cause data to be retransmitted to the buffer 102. In another example, status monitor 112 may generate transfer status messages such as a "done" message upon completion of data transfer by the port processor 104 which may be communicated to other resources of the buffer partitioning system 108.

In the present embodiment, communicatively coupled to the port processor 104 is a byte counter 114 capable of determining a total number of bytes included in a data stream being transferred from the port processor 104. This byte count determination may act to check or confirm the transfer of the streaming data.

Communicatively coupled to the write pointer 110, the status monitor 112, and the byte counter 114, is a partitioning logic 118. The partitioning logic 118 may be suitable for managing the streaming data transfers through the buffer 102. The partition logic may be capable of managing the transfers through the buffer by compiling the information generated by the write pointer 110, the status monitor 112 and the byte counter 114 into attribute information. Attribute information may be inferred from the streaming data. Attribute information may be generated by the buffer partitioning system 108 with information suitable for managing efficient partitioning of the buffer 102. Attribute information includes at least one of a byte count, a transfer status message, an initial buffer offset, and a virtual partition location. For example as a result of communicatively coupling status monitor 112 to the partitioning logic 118, the "done" message may be held as attribute information associated with the streaming data. The partitioning logic 118 may be capable of allowing, for example a DMA processor access to the attribute information, such as when the data stream is sufficiently large enough to consume all available buffer resources. Thus the DMA processor 106 may associate attribute information with data included on the buffer 102. In another embodiment the partitioning logic 118 may record the attribute information for later access by the DMA processor 106. The partition logic may retain the recorded attribute information until the DMA processor 106 has utilized the buffer segment.

In a further embodiment as shown in FIG. 2A, buffer partitioning system 208 may contain a read pointer 216 communicatively linked to write pointer 210. The read pointer 216 may be capable of tracking streaming data to be read from the buffer 202. For example in FIG. 2, read pointer 216 may be connected to a DMA processor 206 to track the DMA processor's removal of data from the buffer 202. The DMA processor 206 may provide the initial buffer offset obtained from a partitioning logic 218 to the read pointer such that the buffer read pointer may track the data being read. In addition, by linking write pointer 210 with the read pointer 216, the buffer partitioning system 208 may derive additional information such as the number of bytes remaining to be read in the segment being read. In a further example, the write pointer 210 linked to read pointer 216, may be suitable for determining data to be read, amount of data to be read, and the like.

Referring generally now to FIG. 2B exemplary data transfers and utilization are shown for the buffer partitioning system of FIG. 2A.

Referring to FIG. 3, an exemplary method 300 of the present invention is shown wherein streaming data transferred through a buffer is decoupled. When streaming data is requested, a port processor initiates the process by creating context information 302. Creating context information 302 may include creating a data identification, a numbering sequence, and a data type. The context information may become a prefix for the streaming data as the data stream is passed through the buffer. Alternatively, context information may be passed separately to a processor, such as a DMA processor independent of the streaming data the context information represents.

In the present embodiment after the port processor creates context information 302, an initial buffer offset 304 may be located by a write pointer An initial buffer offset may become the location on the buffer where the data stream begins to be transferred. Once an initial buffer offset is located a virtual partitioning of the buffer 306 may be located by the write pointer wherein the initial buffer offset forms the starting position of the segment and the virtual partition forms the end location.

Buffer virtual partitioning 304 may be directed by a write pointer based on available buffer resources. Once the buffer has been virtually partitioned to accommodate the streaming data, transferring data to a buffer segment 406 formed by the virtual partitioning may occur. Virtual partitioning may be achieved through the transfer of various streams of data on different locations on the buffer. For example a first data stream may be transferred to the buffer and then a second data stream may be transferred so that the beginning of the second stream of data is located after the end of the first data stream.

While streaming data is transferred to the buffer 308, the buffer partitioning system resources may be capable of inferring attribute information 310 relating to the data stream. Attribute information includes at least one of a byte count, a transfer status message, an initial buffer offset, and a virtual partition location. An initial buffer offset is the location where streaming data will begin to be placed. The virtual partition location is where on the buffer the partition occurred. Transfer status messages are messages inferred from monitoring the transfer of streaming data. A transfer status is data relating to the progression of data being transferred. A byte count is the number of bytes of information contained in the data stream.

While streaming data is transferred to a segment of the buffer 308 attribute information may be compiled by the partitioning logic from the various buffer partitioning system resources, such as the initial buffer offset from the write pointer, the byte count from the byte counter and the like. The partition logic may be capable of allowing access to the attribute information directly by a DMA processor or the like. In an additional embodiment, the attribute information may be recorded in the partition logic 312 for access by the DMA processor or the like. Furthermore, the attribute information may be recorded in the partition logic until the streaming data associated with the attribute information is utilized by the DMA processor or the like at which time the attribute information may be released.

In a further embodiment, the method of decoupling streaming data transfers through a buffer 300 includes the step of tracking the direct memory access processor reading of a buffer segment through the utilization of a read pointer 316.

Referring now to FIG. 4, the interactions between various portions of a buffer partitioning system and a port processor and a DMA processor are illustrated for the transfer of a single data stream. Initially a port processor creates context information 402 relating to data requested, for example from a DMA processor. In the present example, streaming data may be prefixed with context information to be transferred to the buffer with a request to direct and partition available buffer resources. The write pointer may then virtually partition a buffer and direct streaming data to a segment formed on the partitioned buffer 406 based on the available buffer resources. The port processor may begin to transfer streaming data 408. Attribute information may be inferred from the streaming data. Wherein attribute information includes at least one of a byte count, a transfer status message, an initial buffer offset, and a virtual partition location. The DMA processor may then associate the streaming data prefixed with context information to a specific input/output operation to be performed 412 with attribute information received from the partition logic. The DMA processor may then begin to receive streaming data from the buffer 414. The port processor may eventually complete the transfer of the streaming data to the buffer 416. Upon completion of the streaming data transfer the partition logic may record attribute information 418. When the streaming data has been completely received by the DMA processor 420, the DMA processor may release the buffer segment 422 for reuse by the buffer partitioning system. Upon the DMA processor releasing the buffer segment the partition logic may release the attribute information associated with the streaming data 424. It should be apparent that the basic steps may be carried out successively for multiple data streams. For example upon port processor completing the transfer of streaming data the port processor may initiate new context information and streaming data for a second data stream resulting in the port processor transferring data to the buffer for the second data stream while the DMA processor is reading the data from the first data stream. Thus, the data being transferred to the buffer is decoupled from the data being read from the buffer.

It is believed that the BUFFER PARTITIONING FOR MANAGING MULTIPLE DATA STREAMS of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A buffer partitioning system, for decoupling data transfers through a buffer, comprising:
   a write pointer communicatively coupled to the buffer, wherein the write pointer is capable of virtually partitioning the buffer and directing streaming data to a segment of the buffer formed by the virtual partition;
   a status monitor communicatively coupled to a port processor, wherein the status monitor is suitable for generating transfer status messages relating to the transfer of the data stream from the port processor to the buffer;
   a byte counter communicatively coupled to the port processor, wherein the byte counter is capable of determining a total number of bytes in the data stream; and
   a partitioning logic communicatively coupled to the write pointer, the status monitor and the byte counter, wherein the partitioning logic is suitable for managing attribute information inferred from streaming data transfers through the buffer.

2. The buffer partitioning system of claim 1, wherein the partitioning logic is capable of recording attribute information.

3. The buffer partitioning system of claim 2, wherein attribute information includes at least one of a byte count, a transfer status message, an initial buffer offset, and a virtual partition location.

4. The buffer partitioning system of claim 1, further comprising a read pointer communicatively coupled to the buffer such that the read pointer is suitable for tracking a segment of the buffer to be read.

5. The buffer partitioning system of claim 4, wherein the write pointer and the read pointer are communicatively coupled to obtain a number of bytes remaining to be read in the segment being read.

6. The buffer partitioning system of claim 1, wherein the buffer partitioning system is suitable for direct memory access utilization.

7. The buffer partitioning system of claim 1, wherein the write pointer virtually partitions a segment on the buffer with sufficient byte count to contain transferred streaming data.

8. The buffer partitioning system of claim 1, wherein the write pointer is capable of directing a new data stream based on available buffer resources independently of the current data transfer.

9. The buffer partitioning system of claim 1, wherein the buffer partitioning system is capable of providing attribute information to a direct memory access processor.

10. A buffer partitioning system, for decoupling data transfers through a buffer for utilization in direct memory access, comprising:
  a write pointer communicatively coupled to the buffer, wherein the write pointer is capable of virtually partitioning the buffer and directing new streaming data to a segment of the buffer formed by the virtual partition, independently of data currently being transferred;
  a status monitor communicatively coupled to a port processor, wherein the status monitor is suitable for generating transfer status messages relating to the transfer of data from the port processor to the buffer;
  a byte counter communicatively coupled to the port processor, wherein the byte counter is capable of determining a total number of bytes in the data stream; and
  a partitioning logic communicatively coupled to the write pointer, the status monitor and the byte counter, wherein the partitioning logic is suitable for managing attribute information inferred from streaming data transfers through the buffer and recording attribute information.

11. The buffer partitioning system of claim 10, wherein attribute information includes at least one of a byte count, a transfer status message, an initial buffer offset, and a virtual partition location.

12. The buffer partitioning system of claim 10, further comprising a read pointer communicatively coupled to the buffer such that the read pointer is suitable for tracking a segment of the buffer to be read.

13. The buffer partitioning system of claim 12, wherein the write pointer and the read pointer are communicatively coupled to obtain a number of bytes remaining to be read in the segment being read.

14. The buffer partitioning system of claim 10, wherein the write pointer virtually partitions a segment on the buffer with sufficient byte count to contain transferred streaming data.

15. The buffer partitioning system of claim 10, wherein the write pointer is capable of directing a new data stream based on available buffer resources independently of the current data transfer.

16. The buffer partitioning system of claim 10, wherein the buffer partitioning system is capable of providing attribute information to a direct memory access processor.

17. A method for decoupling streaming data transfers through a buffer comprising:
  creating context information suitable for representing streaming data;
  directing the transfer of streaming data to the buffer based on available buffer resources;
  transferring streaming data from a port processor to the buffer such that a virtual partition is located at the end of the stream of data to form a buffer segment;
  monitoring the streaming data transfer to generate a transfer status message related to the transferring streaming data; and
  recording attribute information associated with the data stream in a partition logic.

18. The method of claim 17, wherein attribute information includes at least one of a byte count, a transfer status message, an initial buffer offset, and a virtual partition location.

19. The method of claim 17, further comprising locating an initial buffer offset for the buffer segment based on buffer resources.

20. The method of claim 17, further comprising utilizing a read pointer for tracking a direct memory access processor reading of the buffer segment.

21. The method of claim 17, wherein attribute information is recorded in the partition logic until the data stream is utilized by the direct memory access processor.

22. A method for decoupling streaming data transfers through a buffer for use in direct memory access comprising:
  creating context information suitable for representing streaming data;
  locating an initial buffer offset for streaming data based on context information;
  directing the transfer of streaming data to the buffer based on available buffer resources;
  transferring streaming data from a port processor to the buffer such that a virtual partition is located at the end of the stream of data to form a buffer segment;
  monitoring the streaming data transfer to generate a transfer status message related to the transferring streaming data; and
  recording attribute information associated with the data stream in a partition logic.

23. The method of claim 22, wherein creating context information includes at least one of a data identification, a data type, and a numbering sequence.

24. The method of claim 22, wherein attribute information includes at least one of a byte count, a transfer status message, an initial buffer offset, and a virtual partition location.

25. The method of claim 22, further comprising utilizing a read pointer for tracking a direct memory access processor reading of the buffer segment.

26. The method of claim 22, wherein attribute information is recorded in the partition logic until the data stream is utilized by the direct memory access processor.

* * * * *